United States Patent
Ogawa

(10) Patent No.: US 11,258,942 B2
(45) Date of Patent: Feb. 22, 2022

(54) STORAGE MEDIUM STORING PROGRAM, TERMINAL APPARATUS, AND CONTROL APPARATUS

(71) Applicant: Brother Kogyo Kabushiki Kaisha, Nagoya (JP)

(72) Inventor: Kazuaki Ogawa, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/803,460

(22) Filed: Feb. 27, 2020

(65) Prior Publication Data

US 2020/0280675 A1 Sep. 3, 2020

(30) Foreign Application Priority Data

Mar. 1, 2019 (JP) .............................. JP2019-037506

(51) Int. Cl.
*H04N 5/232* (2006.01)
*H04N 5/262* (2006.01)
*H04N 1/00* (2006.01)

(52) U.S. Cl.
CPC ..... *H04N 5/23222* (2013.01); *H04N 1/00177* (2013.01); *H04N 1/00188* (2013.01); *H04N 5/23218* (2018.08); *H04N 5/2628* (2013.01)

(58) Field of Classification Search
CPC ........... H04N 5/23222; H04N 5/23218; H04N 5/2628
See application file for complete search history.

(56) References Cited

U.S. PATENT DOCUMENTS

| | | | |
|---|---|---|---|
| 9,846,681 B2 | 12/2017 | Hashii et al. | |
| 2004/0080670 A1* | 4/2004 | Cheatle | H04N 1/3872 348/441 |
| 2009/0116752 A1* | 5/2009 | Isomura | G06T 11/60 382/217 |
| 2014/0013217 A1* | 1/2014 | Hashii | G06F 40/106 715/253 |

FOREIGN PATENT DOCUMENTS

| | | |
|---|---|---|
| JP | 2001-045266 A | 2/2001 |
| JP | 2014-016800 A | 1/2014 |

* cited by examiner

*Primary Examiner* — Ahmed A Berhan
(74) *Attorney, Agent, or Firm* — Banner & Witcoff, Ltd.

(57) ABSTRACT

A terminal apparatus performs: receiving a first selection operation of selecting a shot image; acquiring a first characteristic amount relating to a shape of at least one of the shot image and an object included in the shot image; acquiring a second characteristic amount relating to a shape of a frame included in each of a plurality of templates; controlling a display to display a selection screen for selecting one template, the selection screen showing, as a particular template, a template including a frame of the second characteristic amount indicative of a shape corresponding to the first characteristic amount such that the particular template is distinguishable from a template other than the particular template; receiving a second selection operation of selecting a selection template on the selection screen; creating a composite image by combining the shot image with a frame included in the selection template; and outputting the composite image.

6 Claims, 11 Drawing Sheets

STORAGE MEDIUM STORING PROGRAM, TERMINAL APPARATUS, AND CONTROL APPARATUS

CROSS REFERENCE TO RELATED APPLICATIONS

This application claims priority from Japanese Patent Application No. 2019-037506 filed Mar. 1, 2019. The entire content of the priority application is incorporated herein by reference.

TECHNICAL FIELD

This disclosure relates to a storage medium storing a program for creating a composite image that uses a template including a frame, and so on.

BACKGROUND

There is a technique for easily selecting a template suitable for a photographing scene and so on.

SUMMARY

According to one aspect, this specification discloses a non-transitory computer-readable storage medium storing a set of instructions, the set of instructions, when executed by a computer of a terminal apparatus, causing the terminal apparatus to perform: receiving a first selection operation of selecting a shot image; acquiring a first characteristic amount relating to a shape of at least one of the shot image and an object included in the shot image; acquiring a second characteristic amount relating to a shape of a frame included in each of a plurality of templates; controlling a display to display a selection screen for selecting one of the plurality of templates, the selection screen showing, as a particular template, a template including a frame of the second characteristic amount indicative of a shape corresponding to the first characteristic amount in such a manner that the particular template is distinguishable from a template other than the particular template; receiving a second selection operation of selecting, as a selection template, a template on the selection screen; creating a composite image by combining the shot image with a frame included in the selection template; and outputting the composite image.

According to another aspect, this specification also discloses a terminal apparatus. The terminal apparatus includes a display, a controller, and a memory storing a set of instructions. The set of instructions, when executed by the controller, causes the terminal apparatus to perform: receiving a first selection operation of selecting a shot image; acquiring a first characteristic amount relating to a shape of at least one of the shot image and an object included in the shot image; acquiring a second characteristic amount relating to a shape of a frame included in each of a plurality of templates; controlling the display to display a selection screen for selecting one of the plurality of templates, the selection screen showing, as a particular template, a template including a frame of the second characteristic amount indicative of a shape corresponding to the first characteristic amount in such a manner that the particular template is distinguishable from a template other than the particular template; receiving a second selection operation of selecting, as a selection template, a template on the selection screen; creating a composite image by combining the shot image with a frame included in the selection template; and outputting the composite image.

According to still another aspect, this specification also discloses a control apparatus. The control apparatus is configured to communicate with a terminal apparatus including a display. The control apparatus is configured to perform: acquiring a first characteristic amount of a shot image for which a selection operation is performed at the terminal apparatus, the first characteristic amount relating to a shape of at least one of the shot image and an object included in the shot image; acquiring a second characteristic amount relating to a shape of a frame included in each of a plurality of templates; transmitting, to the terminal apparatus, data of a selection screen for selecting one of the plurality of templates, the selection screen showing, as a particular template, a template including a frame of the second characteristic amount indicative of a shape corresponding to the first characteristic amount in such a manner that the particular template is distinguishable from a template other than the particular template; receiving, from the terminal apparatus, information relating to a selection template selected through the selection screen; and transmitting image data of the selection template to the terminal apparatus.

The technique disclosed in this specification may be realized in various modes and, for example, may be realized in modes such as a system including a terminal apparatus and a printer, a control method, and a storage medium storing an application program.

BRIEF DESCRIPTION OF THE DRAWINGS

Embodiments in accordance with this disclosure will be described in detail with reference to the following figures wherein.

DETAILED DESCRIPTION

Although a technique for selecting a template suitable for a photographing scene and so on is known, it is not considered that the shapes of photograph frames (hereinafter, photograph frame is simply referred to as "frame") included in templates are different from each other or that the shape of a frame suitable for a shot image may be different. That is, no technique is shown for selecting a template having a frame depending on a shot image and the shape of a photographic object (hereinafter, photographic object is simply referred to as "object").

In view of the foregoing, an example of an object of this specification is to provide a technique for easily selecting a template having a suitable photograph frame depending on a shot image and the shape of a photographic object.

First Embodiment

Figure 1:
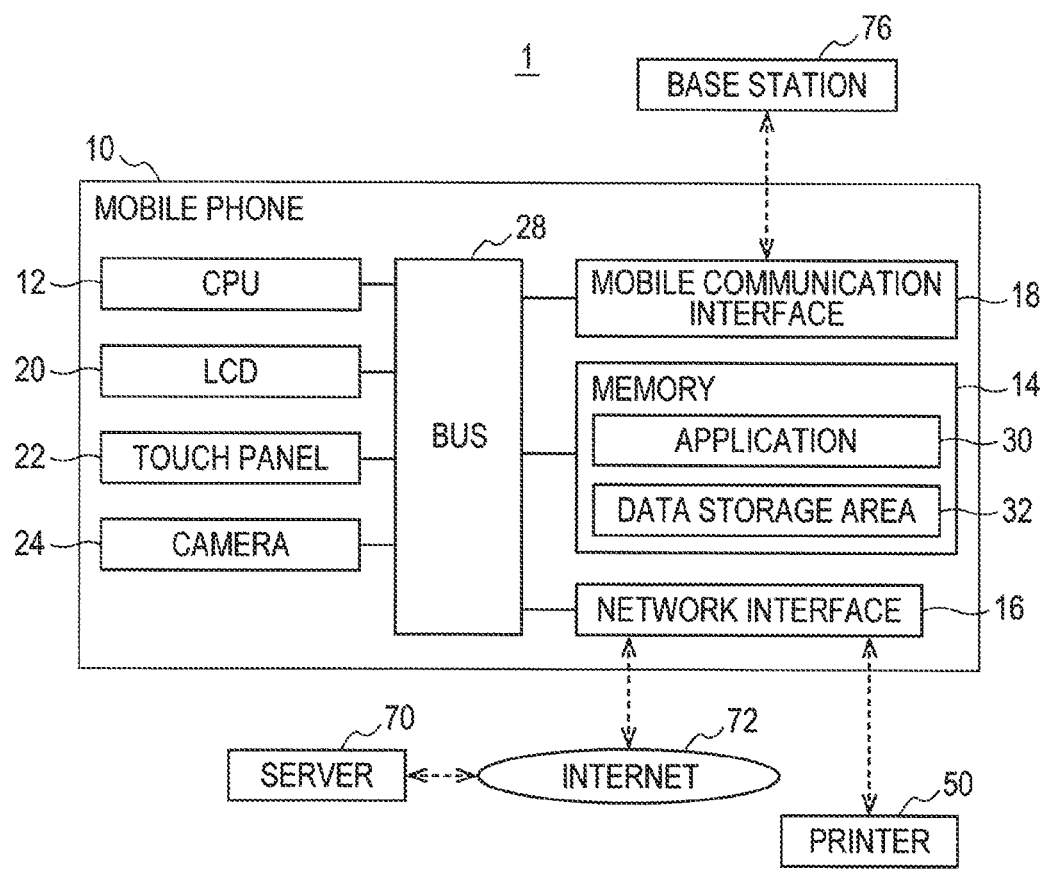
FIG. 1 is a block diagram of a communication system 1.

As shown in FIG. 1, a communication system 1 includes a mobile phone (an example of a terminal apparatus) 10, a printer 50, a server (an example of a control apparatus) 70. The mobile phone 10 and the printer 50 are connected to the same network and communicate with each other through a LAN. Each of the mobile phone 10 and the printer 50 communicates with the server 70 through Internet 72.

The mobile phone 10 mainly includes a CPU (an example of a computer and a controller) 12, a memory 14, a network interface 16, a mobile communication interface 18, an LCD (an example of a display) 20, a touch panel 22, and a camera 24. These elements communicate with one another through a bus 28.

The CPU 12 executes processing in accordance with an application (an example of a program) 30 in the memory 14. The application 30 is an application program for combining a template and a photograph to create a composite image and transmitting print image data based on the composite image to the printer 50, so that print processing by the printer 50 is performed. Note that the CPU 12 executing the application 30 is simply called by a program name. For example, "the application 30" may mean "the CPU 12 executing the application 30".

The memory 14 includes a data storage area 32. The data storage area 32 is an area for storing data necessary for executing the application 30 and so on. The memory 14 is formed by the combination of a RAM, a ROM, a flash memory, a HDD, a buffer provided in the CPU 12, and so on. The memory 14 may be a computer-readable storage medium. The computer-readable storage medium is a non-transitory medium. In addition to the above examples, the non-transitory medium includes storage mediums such as a CD-ROM and a DVD-ROM. The non-transitory medium is a tangible medium. In contrast, an electric signal for conveying a program downloaded from a server on the Internet is a computer-readable signal medium which is a kind of a computer-readable medium, but is not a non-transitory computer-readable storage medium.

The network interface 16 is an interface for performing transmission and reception of signals with an external apparatus through the Internet 72. With this configuration, the mobile phone 10 performs transmission and reception of data with the server 70 through the Internet 72. The mobile communication interface 18 is an interface for performing wireless communication with a mobile telephone communication method with a base station 76.

The LCD 20 includes a display surface for displaying various functions of the mobile phone 10. The touch panel 22 has a touch sensor and is arranged to cover the display surface of the LCD 20. The touch panel 22 detects proximity or contact of a finger of a user, a touch pen, and so on with the touch panel 22, and outputs an electric signal based on the detection. The camera 24 is a device for shooting an image, and is built in the mobile phone 10.

In this specification, the processing of the CPU 12 in accordance with commands described in programs is mainly shown. That is, the processing such as "determination", "extraction", "selection", "calculation", "determination", "identification", "acquisition", "reception", and "control" show processing of the CPU 12. The processing by the CPU 12 also includes hardware control through an OS (operation system). The "acquisition" does not necessarily require requesting. That is, the idea that "the CPU 12 acquires data" includes the processing in which the CPU 12 receives data without making a request. Further, "data" in this specification is represented by a bit array that is readable by a computer. The data having substantially the same meaning but having different formats are treated as the same data. The same goes for "information" in this specification. The processing such as "command", "response", and "request" is performed by communication of information indicative of "command", "response", and "request". The processing such as "setting" is performed by storing inputted setting information in a memory.

In the communication system 1, in accordance with the above-described configuration, in a case where a photograph of a print target is selected on the mobile phone 10, a template including a frame suitable for the selection photograph is displayed preferentially. And, when a template is selected by a user operation, a photograph is combined with a frame included in the selected template, and print image data of the combined image (composite image) is transmitted to the printer 50. With this operation, a photograph combined with the frame of the template is printed in the printer 50.

Figure 2:
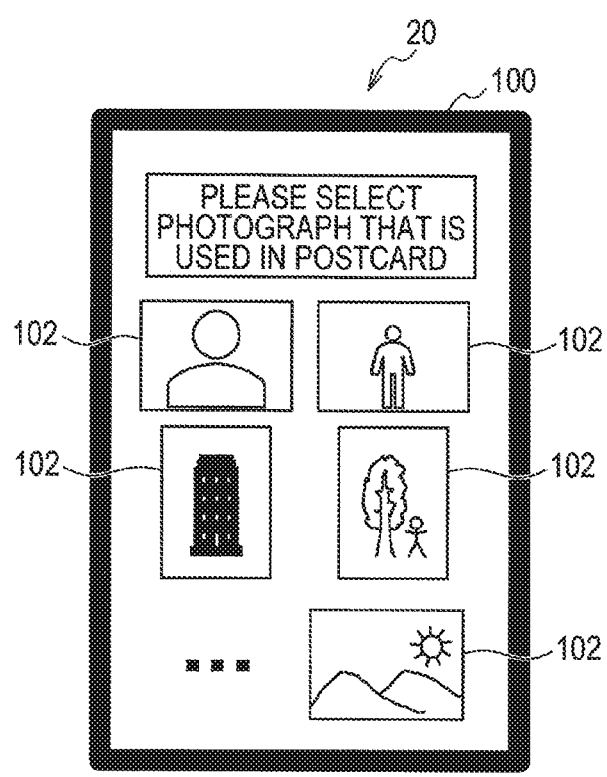
FIG. 2 is a diagram showing a photograph selection screen 100.

Specifically, in the mobile phone 10, the application 30 causes a photograph selection screen 100 shown in FIG. 2 to be displayed on the LCD 20. For example, the photograph selection screen 100 includes a plurality of photographs (an example of a shot image) 102 that is stored in the memory 14 by shooting with the camera 24 and so on. And, based on a user operation, a photograph is selected from among the plurality of photographs 102 displayed on the photograph selection screen 100.

A plurality of templates each including a frame for combining the photograph selected on the photograph selection screen 100 (hereinafter, referred to as "selection photograph") is prepared and is stored in the data storage area 32. Any one of the plurality of templates is selected by a user operation, and the selection photograph is combined with the frame of the selected template. For this, a selection screen for selecting a template from among the plurality of templates is displayed on the LCD 20, and the template including the frame for combining the selection photograph is selected through a user operation to the selection screen. However, there are cases that a photograph image and an object cannot be combined with a frame appropriately unless the selection photograph, the object appearing in the selection photograph, and the shape of the frame are considered.

Figure 3A:
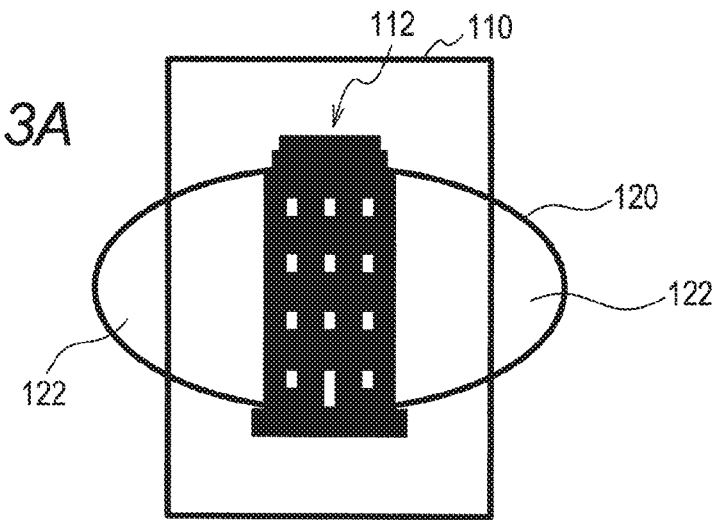
FIGS. 3A to 3C are diagrams each showing a selection photograph 110 that is combined with a frame.
Figure 3B:
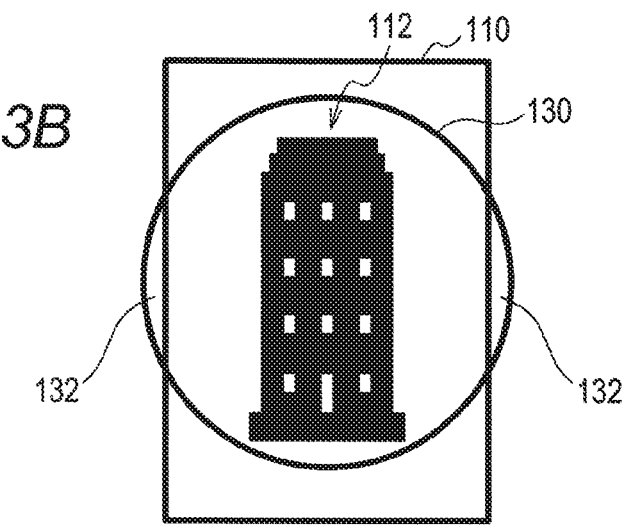
Figure 3C:
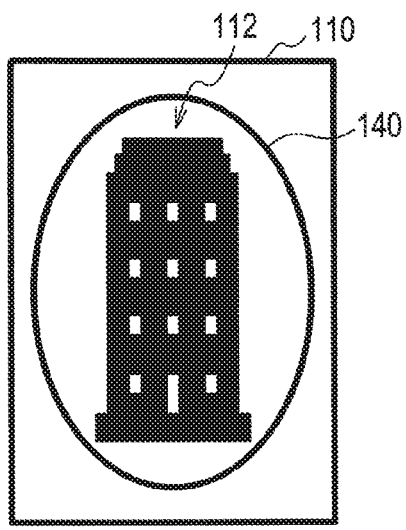

Specifically, for example, a case is considered in which a selection photograph 110 shown in FIGS. 3A to 3C is selected in the photograph selection screen 100. The selection photograph 110 has a substantially rectangular shape, and the size of the selection photograph 110 in the vertical direction is larger than the size of the selection photograph 110 in the horizontal direction. An object 112 appearing in the selection photograph 110 has a shape extending in the vertical direction. For example, if the object 112 of the selection photograph 110 is combined with a frame 120 shown in FIG. 3A, the upper end and the lower end of the object 112 may not fit inside the frame 120 since the shape of the frame 120 is an elliptic shape extending in the horizontal direction. Further, the size of the selection photograph 110 in the horizontal direction is smaller than the size of the frame 120 in the horizontal direction. Thus, both ends of the selection photograph 110 in the horizontal direction are located inside both ends of the frame 120 in the horizontal direction, and hence margins 122 are created between the both ends of the selection photograph 110 in the horizontal direction and the both ends of the frame 120 in the horizontal direction. That is, neither the selection photograph 110 nor the object 112 can be appropriately combined with the frame 120.

For example, if the object 112 of the selection photograph 110 is combined inside a frame 130 shown in FIG. 3B, the frame 130 has a substantially true circle shape and the upper end and the lower end of the object 112 fit inside the frame 130. However, because the size of the selection photograph 110 in the horizontal direction is smaller than the size of the frame 130 in the horizontal direction, both ends of the selection photograph 110 in the horizontal direction are located inside both ends of the frame 130 in the horizontal direction, and thus margins 132 are created between the both ends of the selection photograph 110 in the horizontal direction and the both ends of the frame 130 in the horizontal direction. That is, the object 112 can be appropriately combined with the frame 130, but the selection photograph 110 cannot be appropriately combined with the frame 130.

For example, if the object 112 of the selection photograph 110 is combined inside a frame 140 shown in FIG. 3C, the shape of the frame 140 is an elliptic shape extending in the vertical direction and the upper end and the lower end of the object 112 fit inside the frame 140. Since the size of the selection photograph 110 in the horizontal direction is larger than the size of the frame 140 in the horizontal direction, both ends of the selection photograph 110 in the horizontal direction are located outside both ends of the frame 140 in the horizontal direction, and the entire internal region of the frame 140 is filled with the selection photograph 110. That is, not only the object 112 but also the selection photograph 110 can be appropriately combined with the frame 140.

As described above, in a case where the shape of a frame does not correspond to the shapes of the selection photograph 110 and the object 112, the selection photograph 110 and the object 112 cannot be appropriately combined with the frame. In view of this, it is preferable to select, with a user operation, a template including a frame with which the selection photograph 110 and the object 112 can be appropriately combined, rather than a template including a frame with which the selection photograph 110 and the object 112 cannot be appropriately combined. Thus, in the mobile phone 10, the application 30 calculates an amount of difference between the shapes of the selection photograph 110 and the object 112 and the shape of the frame, and displays templates in ascending order of the calculated amount of difference in the selection screen of templates. That is, the template including a frame with which the selection photograph 110 and the object 112 can be appropriately combined is displayed in preference to the template including a frame with which the selection photograph 110 and the object 112 cannot be appropriately combined.

Figure 4:
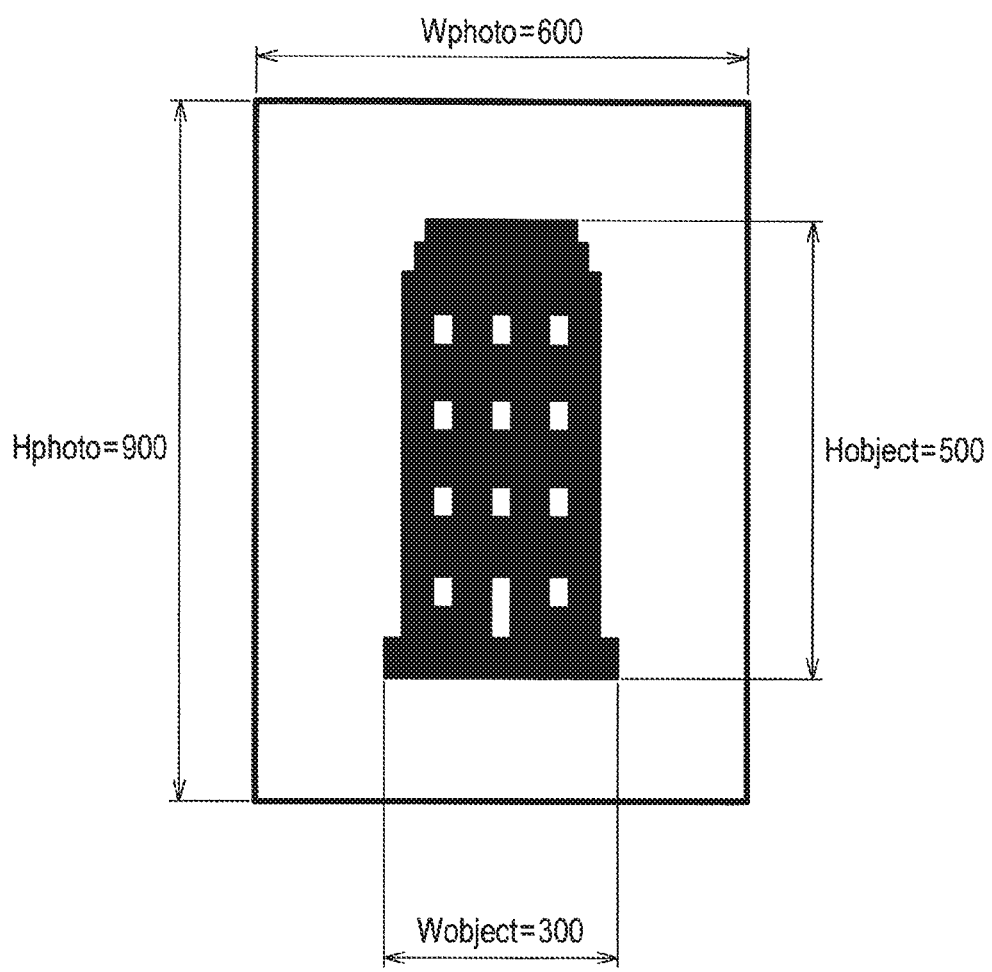
FIG. 4 is a diagram showing photograph size information and object size information.

Specifically, the application 30 analyzes image data of the selection photograph 110 (hereinafter referred to as "photograph data"), and calculates the number of pixels of the selection photograph 110 in the horizontal direction and the number of pixels of the selection photograph 110 in the vertical direction. At this time, the application 30 calculates the maximum number of pixels of the selection photograph 110 in the horizontal direction and the maximum number of pixels of the selection photograph 110 in the vertical direction. Here, as shown in FIG. 4, the number of pixels of the selection photograph 110 in the horizontal direction (=Wphoto) is 600 pixels, and the number of pixels of the selection photograph 110 in the vertical direction (=Hphoto) is 900 pixels. Here, the number of pixels of the selection photograph 110 in the horizontal direction and the number of pixels of the selection photograph 110 in the vertical direction may be collectively referred to as photograph size information (an example of a first characteristic amount).

The application 30 converts photograph data to grayscale, and binarizes the grayscaled photograph data. Subsequently, the application 30 extracts an outline appearing in the selection photograph 110, based on the binarized photograph data. Then, the application 30 calculates the number of pixels of the object 112 in the horizontal direction and the number of pixels of the object 112 in the vertical direction by regarding the extracted outline as the outline of the object 112. At this time, the application 30 calculates the maximum number of pixels of the object 112 in the horizontal direction and the maximum number of pixels of the object 112 in the vertical direction. Here, the number of pixels of the object 112 in the horizontal direction (=Wobject) is 300 pixels, and the number of pixels of the object 112 in the vertical direction (=Hobject) is 500 pixels. Here, the number of pixels of the object 112 in the horizontal direction and the number of pixels of the object 112 in the vertical direction may be collectively referred to as object size information (an example of a first characteristic amount).

The application 30 extracts, from image data of the template of the selection target (hereinafter referred to as "template data"), image data at an approximate position including the entirety of the frame of that template (hereinafter referred to as "frame data"). Note that template data includes information indicative of the position of a frame, and the application 30 extracts frame data from the template data by using that information. In a case where the template data does not include information indicative of the position of a frame, the application 30 extracts frame data from the template data based on color data inside a frame, the arrangement pattern of pixels indicating the frame, and so on.

Figure 5A:
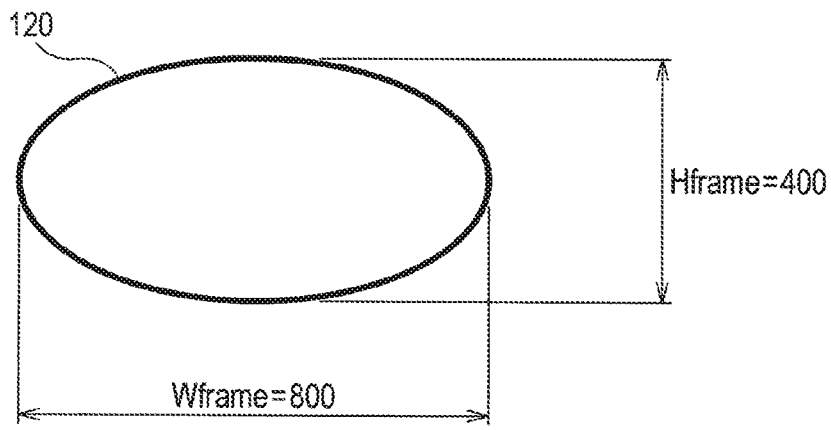
FIGS. 5A to 5C are diagrams each showing frame size information.
Figure 5B:
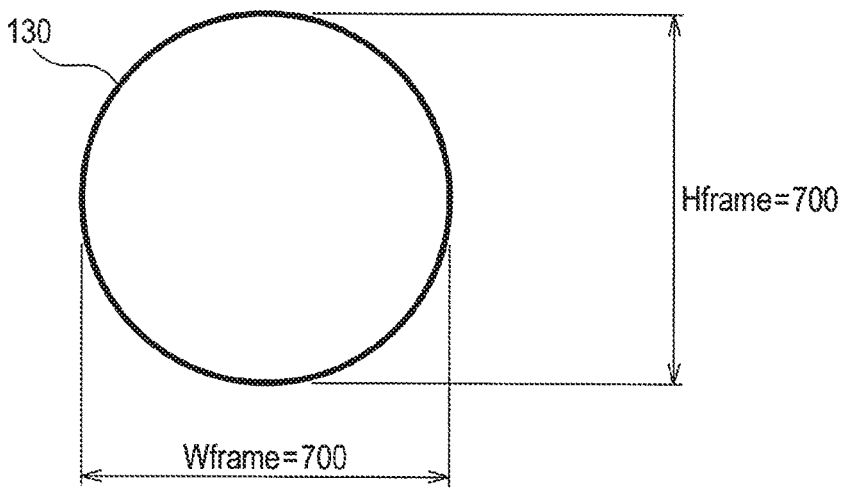
Figure 5C:
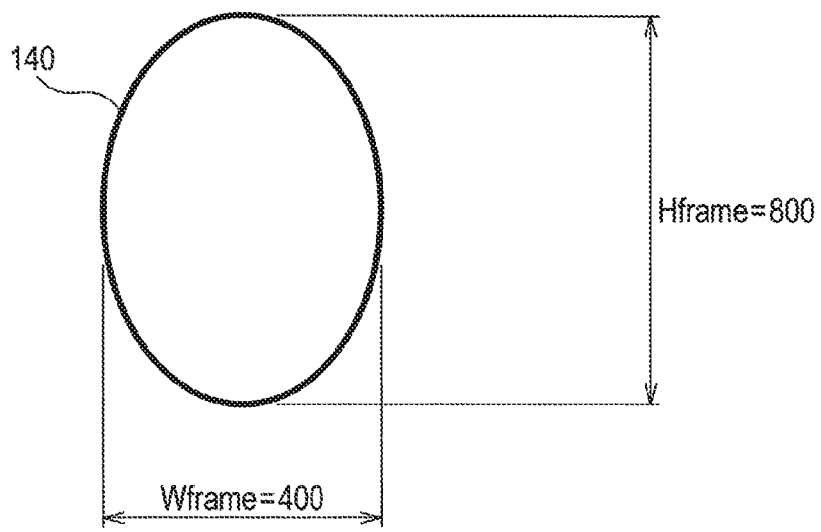

Next, the application 30 converts frame data to grayscale, and binarizes the grayscaled frame data. Subsequently, the application 30 extracts, based on the binarized frame data, an outline within an image represented by the frame data. Then, the application 30 calculates the number of pixels of the frame in the horizontal direction and the number of pixels of the frame in the vertical direction by regarding the extracted outline as the outline of the frame. At this time, the application 30 calculates the maximum number of pixels of the frame in the horizontal direction and the maximum number of pixels of the frame in the vertical direction. As shown in FIG. 5A, the number of pixels in the horizontal direction of the frame 120 of an elliptic shape extending in the horizontal direction (=Wframe) is 800 pixels, and the number of pixels in the vertical direction of the frame 120 (=Hframe) is 400 pixels. As shown in FIG. 5B, the number of pixels in the horizontal direction of the frame 130 of a substantially true circle shape (=Wframe) is 700 pixels, and the number of pixels in the vertical direction of the frame 130 (=Hframe) is 700 pixels. As shown in FIG. 5C, the number of pixels in the horizontal direction of the frame 140 of an elliptic shape extending in the vertical direction (=Wframe) is 400 pixels, and the number of pixels in the vertical direction of the frame 140 (=Hframe) is 800 pixels. Note that the number of pixels of a frame in the horizontal direction and the number of pixels of the frame in the vertical direction may be collectively referred to as frame size information (an example of a second characteristic amount).

After calculating the photograph size information, the object size information, and the frame size information, the application 30 calculates, based on those three kinds of size information, the amount of difference between the shapes of the selection photograph 110 and the object 112 and the shape of the frame (hereinafter referred to as "photograph and object difference value") (=SIMall). The photograph and object difference value (=SIMall) is calculated in accordance with the equation shown below.

$$SIMall = \alpha \times SIMphoto + (1-\alpha) \times SIMobject$$

Here, the SIMphoto indicates the amount of difference between the shape of the selection photograph 110 and the shape of the frame (hereinafter referred to as "photograph difference value"), and the SIMobject indicates the amount of difference between the shape of the object 112 and the shape of the frame (hereinafter referred to as "object difference value"). The photograph difference value (=SIMphoto) and the object difference value (=SIMobject) are calculated in accordance with the equations shown below.

$$SIMphoto = |(Wframe/Hframe) - (Wphoto/Hphoto)|$$

$$SIMobject = |(Wframe/Hframe) - (Wobject/Hobject)|$$

The parameter $\alpha$ is for arbitrarily setting the ratio of the photograph difference value (=SIMphoto) to the object difference value (=SIMobject), and may be set to any value between 0 and 1.

That is, the photograph difference value (=SIMphoto) is indicative of the amount of difference between the ratio of the size of the frame in the vertical direction to the size of the frame in the horizontal direction and the ratio of the size of the selection photograph 110 in the vertical direction to the size of the selection photograph 110 in the horizontal direction. The object difference value (=SIMobject) is indicative of the amount of difference between the ratio of the size of the frame in the vertical direction to the size of the frame in the horizontal direction and the ratio of the size of the object 112 in the vertical direction to the size of the object 112 in the horizontal direction. And, the photograph and object difference value (=SIMall) is the amount of difference that is obtained by combining (mixing) the photograph difference value (=SIMphoto) with the object difference value (=SIMobject) by using an arbitrary ratio.

If the photograph and object difference value (=SIMall) shown above is calculated based on the frame size information of the frame 120 shown in FIG. 5A and the photograph size information and the object size information of the selection photograph 110 shown in FIG. 3A, then the photograph and object difference value (=SIMall) becomes "1.36" as shown by the equations below. Here, a is set to 0.5.

$$SIMphoto = |(800/400) - (600/900)| \approx 1.33$$

$$SIMobject = |(800/400) - (300/500)| = 1.4$$

$$SIMall = 0.5 \times 1.33 + (1-0.5) \times 1.4 \approx 1.36$$

Note that the photograph and object difference value (=SIMall) may be calculated as $SIMall = |(800/400) - \{0.5 \times (600/900) + (1-0.5) \times (300/500)\}| \approx 1.36$. Here, a characteristic amount obtained by combining the characteristic amount relating to the shape of the shot image (the photograph size information) with the characteristic amount relating to the shape of the object (the object size information) by using a particular ratio may be referred to as "combined first characteristic amount" (which corresponds to the value $\{0.5 \times (600/900) + (1-0.5) \times (300/500)\}$ in the above calculation.

If the photograph and object difference value (=SIMall) shown above is calculated based on the frame size information of the frame 130 shown in FIG. 5B and the photograph size information and the object size information of the selection photograph 110 shown in FIG. 3B, then the photograph and object difference value (=SIMall) becomes "0.36" as shown by the equations below. Here, $\alpha$ is set to 0.5.

$$SIMphoto = |(700/700) - (600/900)| \approx 0.33$$

$$SIMobject = |(700/700) - (300/500)| = 0.4$$

$$SIMall = 0.5 \times 0.33 + (1-0.5) \times 0.4 \approx 0.36$$

If the photograph and object difference value (=SIMall) shown above is calculated based on the frame size information of the frame 140 shown in FIG. 5C and the photograph size information and the object size information of the selection photograph 110 shown in FIG. 3C, then the photograph and object difference value (=SIMall) becomes "0.13" as shown by the equations below. Here, $\alpha$ is set to 0.5.

$$SIMphoto = |(400/800) - (600/900)| \approx 0.17$$

$$SIMobject = |(400/800) - (300/500)| = 0.1$$

$$SIMall = 0.5 \times 0.17 + (1-0.5) \times 0.1 \approx 0.13$$

Figure 6:
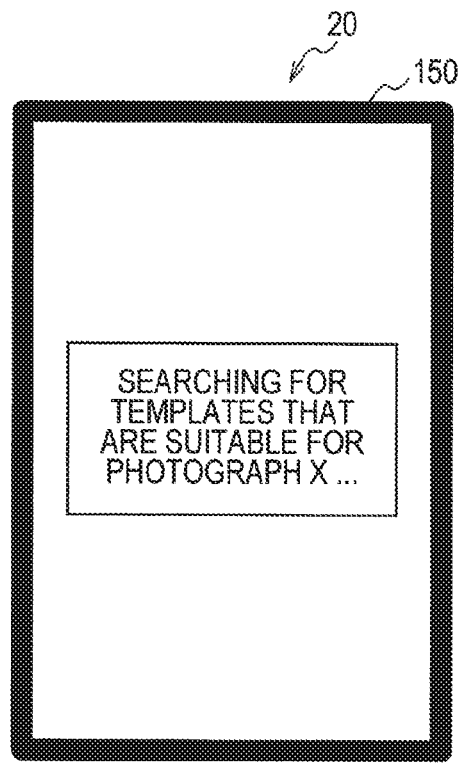
FIG. 6 is a diagram showing a waiting screen 150.
Figure 7:
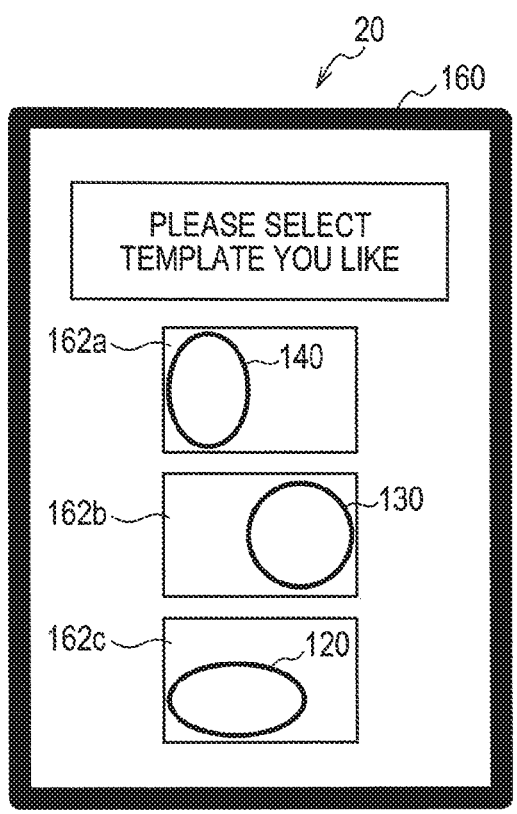
FIG. 7 is a diagram showing a template selection screen 160.

A waiting screen 150 shown in FIG. 6 is displayed on the LCD 20 while the photograph size information, the object size information, and the frame size information are calculated and the photograph and object difference value (=SIMall) is calculated after the selection photograph 110 is selected on the photograph selection screen 100. That is, after the selection photograph 110 is selected on the photograph selection screen 100, the application 30 causes the waiting screen 150 to be displayed on the LCD 20. Upon calculating the photograph and object difference value (=SIMall), the application 30 causes a template including the above three frames 120, 130, and 140 to be displayed on the selection screen in ascending order of the calculated photograph and object difference value (=SIMall). That is, upon calculating the photograph and object difference value (=SIMall), the application 30 causes a template selection screen 160 shown in FIG. 7 to be displayed on the LCD 20. In the template selection screen 160, three templates 162 are displayed in the order of a template 162a including the frame 140, a template 162b including the frame 130, and a template 162c including the frame 120, from the top. That is, the template selection screen 160 displays a template including a frame having a small photograph and object difference value (=SIMall) as a preferred template (an example of a particular template) so as to be distinguishable from a template including a frame having a large photograph and object difference value (=SIMall).

Figure 8:
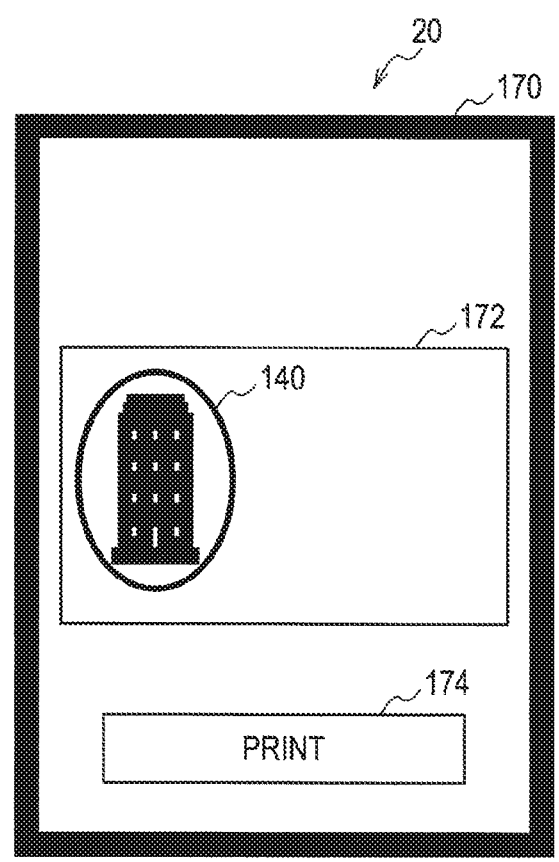
FIG. 8 is a diagram showing a preview screen 170.

When any one template is selected from among the plurality of templates 162 by a user operation on the template selection screen 160, the application 30 combines (synthesizes) the selection photograph 110 with the selected template (hereinafter referred to as "selection template") such that the object 112 fits in the frame included in the selection template, thereby creating a composite image. Upon creating the composite image, the application 30 causes a preview screen 170 shown in FIG. 8 to be displayed on the LCD 20. The preview screen 170 displays a preview image 172 of the created composite image. Note that the preview screen 170 displays the preview image 172 of the composite image in which the selection photograph 110 is combined with the template 162a including the frame 140 having the smallest photograph and object difference value (=SIMall).

The preview screen 170 also displays a print button 174. Upon receiving a user operation to the print button 174, the application 30 creates print image data of the composite image. The application 30 then transmits the created print image data to the printer 50. With this operation, the printer 50 prints the photograph that is combined with the frame of the template.

In the above, a case is described in which one selection photograph 110 is selected in the photograph selection screen 100. In the case where one selection photograph 110 is selected in that way, the photograph and object difference value (=SIMall) is calculated for templates each including one frame. And, the templates each including one frame are displayed in the template selection screen 160 in ascending order of the photograph and object difference value (=SIMall). Further, a plurality of selection photographs may be selected in the photograph selection screen 100. In a case where a plurality of selection photographs is selected, the photograph and object difference value (=SIMall) is calculated for templates each including the same number of frames as the selection photographs. That is, for example, in a case where three selection photographs are selected, the photograph and object difference value (=SIMall) is calculated for templates each including three frames. Then, the templates including the same number of frames as the selection photographs are displayed in the template selection screen 160 in ascending order of the photograph and object difference value (=SIMall).

As the method for calculating the photograph and object difference value (=SIMall) between a plurality of selection photographs and the same number of frames as the plurality of selection photographs, for example, the photograph and object difference value (=SIMall) between each of the plurality of selection photographs and the plurality of frames may be calculated. Then, the templates are displayed in ascending order of a total value, an average value, or the like, of the photograph and object difference values (=SIMall) of the plurality of frames included in one template.

More specifically, for example, in a case where three selection photographs are selected, the three selection photographs are referred to as Photograph 1, Photograph 2, and Photograph 3. Two templates (Template 1, Template 2) each including three frames are provided. Template 1 includes three frames (Frame A, Frame B, Frame C). Template 2 includes three frames (Frame D, Frame E, Frame F). Regarding Template 1, nine combinations are considered, which are Photograph 1 and Frame A, Photograph 1 and Frame B, Photograph 1 and Frame C, Photograph 2 and Frame A, Photograph 2 and Frame B, Photograph 2 and Frame C, Photograph 3 and Frame A, Photograph 3 and Frame B, and Photograph 3 and Frame C. Thus, the photograph and object difference value (=SIMall) for each of the nine combinations is calculated. Similarly, regarding Template 2, nine combinations are considered, which are Photograph 1 and Frame D, Photograph 1 and Frame E, Photograph 1 and Frame F, Photograph 2 and Frame D, Photograph 2 and Frame E, Photograph 2 and Frame F, Photograph 3 and Frame D, Photograph 3 and Frame E, and Photograph 3 and Frame F. Thus, the photograph and object difference value (=SIMall) for each of the nine combinations is calculated. Then, the total (or average) of the photograph and object difference values (=SIMall) for the nine combinations for Template 1 is compared with the total (or average) of the photograph and object difference values (=SIMall) for the nine combinations for Template 2, and the templates are displayed in ascending order of the total (or average) of the photograph and object difference values (=SIMall).

Alternatively, for example, the photograph and object difference value (=SIMall) between each of any one or more selection photographs out of the plurality of selection photographs and the plurality of frames may be calculated. In other words, a representative photograph may be selected from the selected plurality of photographs, and the above-described calculation may be performed between the representative photograph and each of the plurality of templates. Further, not only a representative photograph is selected, but also a representative frame may be selected from each of the plurality of templates, and the above-described calculation may be performed between the representative photograph and the representative frame in each of the plurality of templates.

Next, processing of executing the application 30 by the CPU 12 of the mobile phone 10 will be described while referring to FIGS. 9 to 11. First, the application 30 displays the photograph selection screen 100 on the LCD 20 (S100). Then, the application 30 determines whether a selection operation of a photograph has been received on the photograph selection screen 100 (S102). In response to determining that no selection operation of a photograph has been received (S102: NO), the processing of S102 is repeated. In response to determining that a selection operation of a photograph has been received (S102: YES), the application 30 identifies template(s) that becomes the target, depending on the number of photographs for which a selection operation has been received (S103). That is, templates each including the same number of frames as the selection photographs are identified as templates of the calculation target of the photograph and object difference value (=SIMall). Then, the application 30 executes a photograph and object size information acquisition subroutine (S104).

Figure 10:
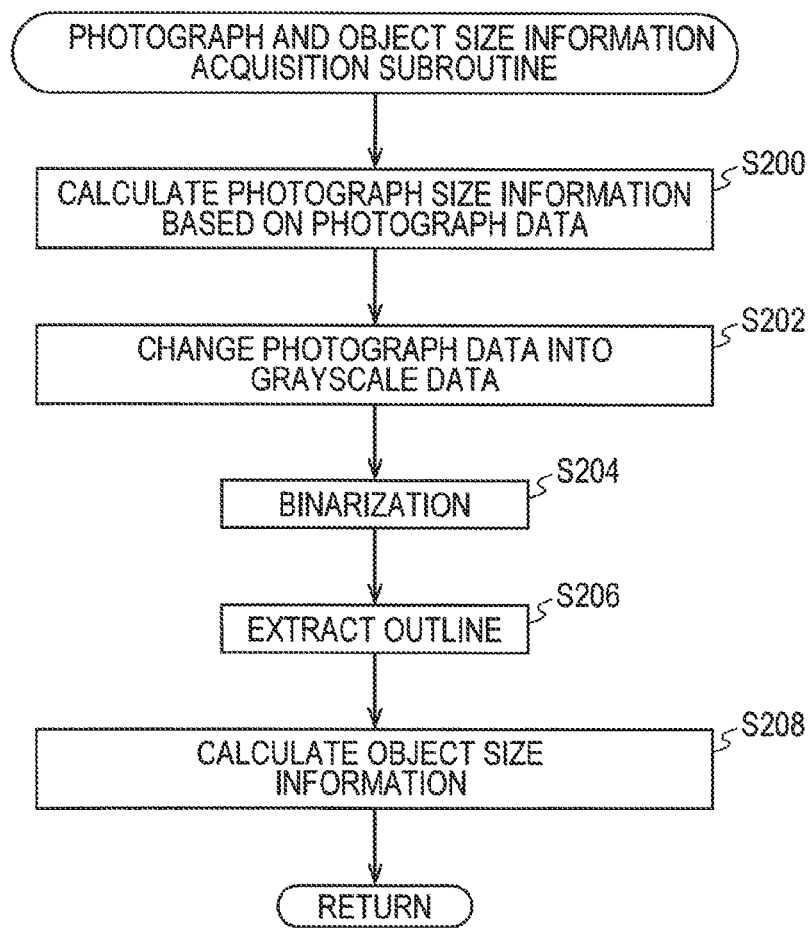
FIG. 10 is a flowchart showing a photograph and object size information acquisition subroutine of the application 30.

In the photograph and object size information acquisition subroutine shown in FIG. 10, the application 30 calculates photograph size information based on photograph data (S200). The application 30 converts the photograph data to grayscale data (S202). Next, the application 30 binarizes grayscale photograph data (S204). Subsequently, the application 30 extracts the outline of the object 112 based on the binarized photograph data (S206). Then, the application 30 calculates the object size information based on the extracted outline of the object 112 (S208). With this operation, the photograph and object size information acquisition subroutine ends.

Figure 11:
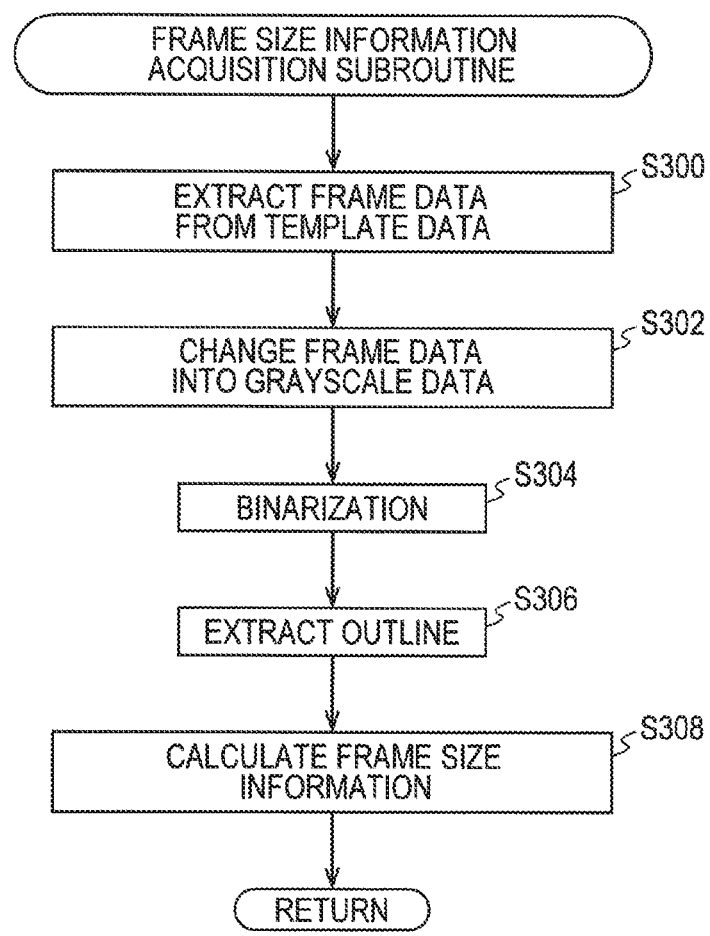
FIG. 11 is a flowchart showing a frame size information acquisition subroutine of the application 30.

Upon ending the photograph and object size information acquisition subroutine shown in FIG. 11, in the main routine, the application 30 executes a frame size information acquisition subroutine (S106). In the frame size information acquisition subroutine, the application 30 extracts frame data from template data of one of a plurality of templates each including the same number of frames as the number of the selection photographs 110 (S300). Next, the application 30 converts frame data to grayscale data (S302). Subsequently, the application 30 binarizes grayscale frame data (S304). Further, the application 30 extracts the outline of the frame based on the binarized photograph data (S306). Then, the application 30 calculates frame size information based on the extracted outline of the frame (S308). With this operation, the frame size information acquisition subroutine ends.

Upon ending the frame size information acquisition subroutine, in the main routine, the application 30 calculates the photograph and object difference value (=SIMall) in accordance with the above-described procedure (S108). Subsequently, the application 30 determines whether the photograph and object difference value (=SIMall) has been calculated for all the templates identified in S103 (S110). In response to determining that the photograph and object difference value (=SIMall) has not been calculated for all the templates (S110: NO), the processing returns to S106. In response to determining that the photograph and object difference value (=SIMall) has been calculated for all of the plurality of templates (S110: YES), the application 30 displays the templates 162 in the template selection screen 160 in ascending order of the photograph and object difference value (=SIMall) (S112).

Next, the application 30 determines whether a template has been selected in the template selection screen 160 (S114). In response to determining that no template has been selected (S114: NO), the processing of S114 is executed repeatedly. In response to determining that a template has been selected (S114: YES), the application 30 creates a composite image of the selected template and the selection photograph 110 such that the object 112 fits in the frame included in the selected template (S116). Then, the application 30 displays the preview screen 170 on the LCD 20 (S118). Subsequently, the application 30 creates print image data of the composite image, and transmits the created print image data to the printer 50 (S120). With this operation, the processing of this flowchart ends.

The CPU 12 that executes S102 is an example of first reception means. The CPU 12 that executes S104 is an example of first acquisition means. The CPU 12 that executes S106 is an example of second acquisition means. The CPU 12 that executes S112 is an example of display control means. The CPU 12 that executes S114 is an example of second reception means. The CPU 12 that executes S116 is an example of creation means. The CPU 12 that executes S120 is an example of output means.

According to the technique disclosed in the above-described embodiment, based on at least one of a shot image and an object included in the shot image, the first characteristic amount relating to the shape of at least one of the shot image and the object is acquired. Further, the second characteristic amount relating to the shape of a frame included in a template is acquired. Then, the template including the frame of the second characteristic amount indicative of the shape corresponding to the first characteristic amount is preferentially displayed. Thus, depending on the shape of the shot image and the object, an appropriate template can be selected easily.

Second Embodiment

Figure 12:
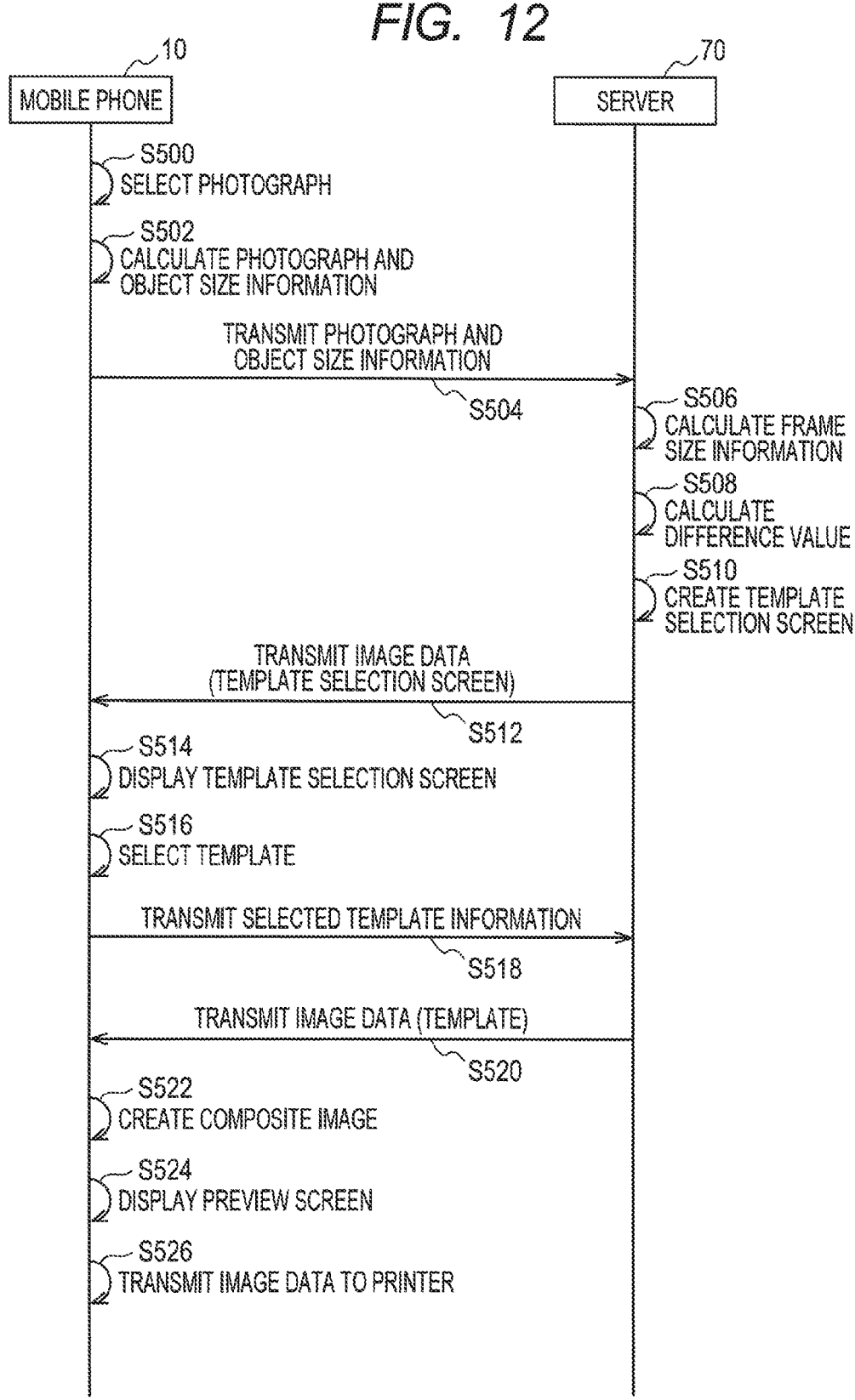
FIG. 12 is a sequence chart showing processing of the communication system 1 according to a second embodiment.

In the communication system 1 of the first embodiment, templates are stored in the mobile phone 10, and the photograph and object difference value (=SIMall) is calculated in the mobile phone 10. In the communication system 1 of a second embodiment, templates are stored in the server 70, and the photograph and object difference value (=SIMall) is calculated in the server 70. The server 70 may be a well-known server that includes a controller (CPU), a memory, a communication interface, and so on. The second embodiment will be described below while referring to the sequence chart shown in FIG. 12.

In the communication system 1 of the second embodiment, the photograph selection screen 100 is displayed on the LCD 20 in the mobile phone 10, and the selection photograph 110 is selected on the photograph selection screen 100 (S500). Subsequently, in the mobile phone 10, the photograph size information and the object size information are calculated in accordance with the above-described processing, that is, the processing corresponding to S104 in FIG. 9 (S502). Then, the mobile phone 10 transmits the calculated photograph size information and object size information to the server 70 (S504).

Subsequently, the server 70 identifies templates each having frames corresponding to the number of the received photograph size information and object size information, that is, the number of the selected selection photographs, and calculates the frame size information of all the identified templates (S506). That is, the server 70 calculates the frame size information in accordance with the processing corresponding to S103 and S106 in FIG. 9. Next, the server 70 calculates the photograph and object difference value (=SIMall) based on the photograph size information and the object size information acquired from the mobile phone 10 and on the calculated frame size information (S508). That is, the server 70 calculates the photograph and object difference value (=SIMall) in accordance with the processing corresponding to S108 in FIG. 9.

Subsequently, the server 70 creates image data for displaying the template selection screen 160 (S510). That is, the server 70 creates image data of the template selection screen 160 for preferentially displaying the template having a small photograph and object difference value (=SIMall). Then, the server 70 transmits the image data of the template selection screen 160 to the mobile phone 10 (S512).

Next, the mobile phone 10 displays the template selection screen 160 on the LCD 20 based on the received image data (S514). Subsequently, the mobile phone 10 receives a selection operation for selecting, as a selection template, a template in the template selection screen 160 (S516). Then, the mobile phone 10 transmits, to the server 70, the received template, that is, information indicative of the selection template (S518). In response to receiving the information indicative of the selection template, the server 70 transmits, to the mobile phone 10, image data of the selection template corresponding to that information (S520).

In response to receiving the image data of the selection template, the mobile phone 10 creates a composite image of the selection template and the selection photograph 110 such that the object 112 fits in the frame included in the selection template based on the image data (S522). Then, the mobile phone 10 displays the preview screen 170 on the LCD 20 (S524). Subsequently, the mobile phone 10 creates print image data of the composite image, and transmits the created print image data to the printer 50 (S526). With this operation, the processing in the communication system 1 of the second embodiment ends.

The server 70 that executes S504 is an example of first acquisition means. The server 70 that executes S506 is an example of second acquisition means. The server 70 that executes S512 is an example of first transmission means. The server 70 that executes S518 is an example of reception means. The server 70 that executes S520 is an example of second reception means.

Effects of Embodiment

According to the above-described embodiments, the following effects are obtained.

In the mobile phone 10 of the first embodiment, the photograph size information is calculated as the characteristic amount relating to the shape of the selection photograph 110, and the object size information is calculated as the characteristic amount relating to the shape of the object 112. Further, the frame size information is calculated as the characteristic amount relating to the shape of the frame. Then, the photograph and object difference value (=SIMall) is calculated based on the photograph size information, the object size information, and the frame size information, and the template including a frame having a small photograph and object difference value (=SIMall) is preferentially displayed. That is, the template including the frame having a small photograph and object difference value (=SIMall) is displayed as the preferred template so as to be distinguishable from a template including a frame having a large photograph and object difference value (=SIMall). With this operation, it is possible to preferentially display the template including the frame with which the selection photograph 110 and the object 112 can be appropriately combined, which improves usability for a user.

In a case where a plurality of selection photographs is selected, the template including the same number of frames as the selection photographs and including frames having small photograph and object difference value (=SIMall) is displayed as the preferred template. This enables a user to easily select a template in which all the photographs selected by the user can be combined with the frames.

The object size information adopted as the characteristic amount relating to the shape of the object 112 is information indicative of the size of the object 112 in the horizontal direction and the size of the object 112 in the vertical direction, that is, information indicative of the aspect ratio of the object 112. The photograph size information adopted as the characteristic amount relating to the shape of the selection photograph 110 is information indicative of the size of the selection photograph 110 in the horizontal direction and the size of the selection photograph 110 in the vertical direction, that is, information indicative of the aspect ratio of the selection photograph 110. The frame size information adopted as the characteristic amount relating to the shape of the frame is information indicative of the size of the frame in the horizontal direction and the size of the frame in the vertical direction, that is, information indicative of the aspect ratio of the frame. As the difference between the object size information and the frame size information is smaller, that is, as the object size information and the frame size information are similar to each other, the object difference value (=SIMobject) becomes smaller and consequently the photograph and object difference value (=SIMall) becomes smaller. As the difference between the photograph size information and the frame size information is smaller, that is, as the photograph size information and the frame size information are similar to each other, the photograph difference value (=SIMphoto) becomes smaller and consequently the photograph and object difference value (=SIMall) becomes smaller. Thus, the template including the frame corresponding to the shape of the selection photograph 110 or the object 112 can be preferentially displayed. Further, by adopting, as size information, the information indicative of the aspect ratio of the selection photograph 110, the object 112, and the frame, the frame corresponding to the shape of the selection photograph 110 or the object 112 can be appropriately identified.

The photograph and object difference value (=SIMall) is obtained by mixing the photograph difference value (=SIMphoto) with the object difference value (=SIMobject) by using an arbitrary ratio. Hence, as the frame has a shape closer to both the selection photograph 110 and the object 112, the photograph and object difference value (=SIMall) becomes smaller. Thus, the template in which both the selection photograph 110 and the object 112 fit appropriately in the frame can be displayed preferentially.

In the communication system 1 of the second embodiment, in the mobile phone 10, the photograph size information is calculated as the characteristic amount relating to the shape of the selection photograph 110, and the object size information is calculated as the characteristic amount relating to the shape of the object 112. In the server 70, the frame size information is calculated as the characteristic amount relating to the shape of the frame. The server 70 acquires the photograph size information and the object size information from the mobile phone 10, and calculates the photograph and object difference value (=SIMall) based on the photograph size information, the object size information, and the frame size information. Further, the server 70 creates image data of a screen for preferentially displaying the template including the frame of a small photograph and object difference value (=SIMall), that is, the template selection screen 160, and transmits the created image data to the mobile phone 10. With this operation, the template including the frame with which the selection photograph 110 and the object 112 are appropriately combined can be preferentially displayed on the mobile phone 10. Thus, in the communication system 1 of the second embodiment, the effects similar to those of the communication system 1 of the first embodiment can be obtained.

<Modification>

While the disclosure has been described in detail with reference to the above aspects thereof, it would be apparent to those skilled in the art that various changes and modifications may be made therein without departing from the scope of the claims.

For example, in the above-described embodiment, templates are displayed in ascending order of the photograph and object difference value (=SIMall). However, the template including the frame having a small photograph and object difference value (=SIMall) may be preferentially displayed in a different manner so as to be distinguishable from the template including the frame having a large photograph and object difference value (=SIMall). For example, the template including the frame having a small photograph and object difference value (=SIMall) may be displayed to be larger than the template including the frame having a large photograph and object difference value (=SIMall). Alternatively, for example, the template including the frame having a small photograph and object difference value (=SIMall) may be displayed in a noticeable manner by enclosing with a box, a different display color, blinking, and so on. Alternatively, the display may display a template selection screen including, as selection information, the template including the frame having a small photograph and object difference value (=SIMall) and not including, as selection information, the template including the frame having a large photograph and object difference value (=SIMall). Note that determination of whether the photograph and object difference value (=SIMall) is small or large may be determined, for example, based on whether the photograph and object difference value (=SIMall) is smaller than a particular threshold value. Alternatively, a particular number of templates having small photograph and object difference value (=SIMall) among the templates arranged in the ascending order may be determined as the templates including the frame having a small photograph and object difference value (=SIMall).

In the above-described embodiment, the ratio of the photograph difference value (=SIMphoto) to the object difference value (=SIMobject) when the photograph and object difference value (=SIMall) is calculated is 1:1. However, this ratio may be set arbitrarily. For example, by setting the ratio of the object difference value (=SIMobject) to a large value, the frame can be identified while putting priority on the object 112 rather than the selection photograph 110. Alternatively, in the extreme, the ratio of the photograph difference value (=SIMphoto) to the object difference value (=SIMobject) may be set to 0:1. By setting this way, the frame can be identified while putting priority only on the object 112.

In the above-described embodiment, as the size information of the object size information and so on, the information indicative of the aspect ratio of the object 112 and so on is adopted. Alternatively, information indicative of the shape (for example, a circular shape, a trapezoidal shape, and so on) of the outline of the object 112 and so on, the number of the objects 112, the arrangement density of the objects 112, and so on may be adopted as the size information. Here, the arrangement density of the objects 112 indicates the distance between two objects that are farthest from each other in a case where one photograph includes a plurality of objects. If the distance between two objects is long in a particular direction, a template including a frame having a large ratio in the particular direction may be displayed as the preferred template.

In the above-described embodiment, when the size information of the object 112 and so on is calculated, the outline of the object 112 and so on is extracted by grayscaling and binarization of various data, and the size information is calculated based on the outline. Alternatively, the size information of the object 112 and so on may be calculated by using machine learning. For example, the characteristics of various sample images such as a person, a scenery, and a car are analyzed as the object, and image data indicative of an object is extracted from photograph data by using the analysis result. Then, the object size information may be calculated based on image data indicative of the extracted object.

In the above-described embodiment, the frame size information is calculated based on template data. Alternatively, the frame size information may be preliminarily stored in the data storage area 32 or in the server 70. That is, normally, template data is preliminarily set, and thus the frame of the template indicated by that template data is set as data. Thus, by preliminarily storing data indicative of the frame, the application 30 or the server 70 may acquire the frame size information from the preliminarily stored data.

In the above-described embodiment, the order of priority for displaying templates are determined by using only the photograph and object difference value (=SIMall). Alternatively, the order of priority for displaying templates may be determined by using other information in addition to the photograph and object difference value (=SIMall). For example, templates may be categorized by each category such as the photographing scene and so on of photographs, and the order of priority for displaying templates may be determined by using the category of the template and the photograph and object difference value (=SIMall). In this case, a user may select any one of a plurality of categories, and the templates in the selected category may be displayed in ascending order of the photograph and object difference value (=SIMall). Further, in a case where the photograph and object difference values (=SIMall) of two or more templates have the same value when the photograph and object difference values (=SIMall) are calculated, a template corresponding to the category of the selection photograph may be preferentially displayed from among the two or more templates.

In the above-described first embodiment, selection of the selection photograph 110, calculation of the photograph and object difference value (=SIMall), display of the template selection screen 160, generation of the composite image, generation of print image data, and so on are executed by the processing of the application 30 in the mobile phone 10. Alternatively, these kinds of processing may be executed in the printer 50. That is, a control program for executing the processing equivalent to the application 30 may be installed on the printer 50.

In the above-described second embodiment, the server 70 acquires the photograph size information and the object size information from the mobile phone 10. Alternatively, the server 70 may acquire the selection photograph 110 from the mobile phone 10 and may calculate the photograph size information and the object size information based on the acquired selection photograph 110.

Figure 9:
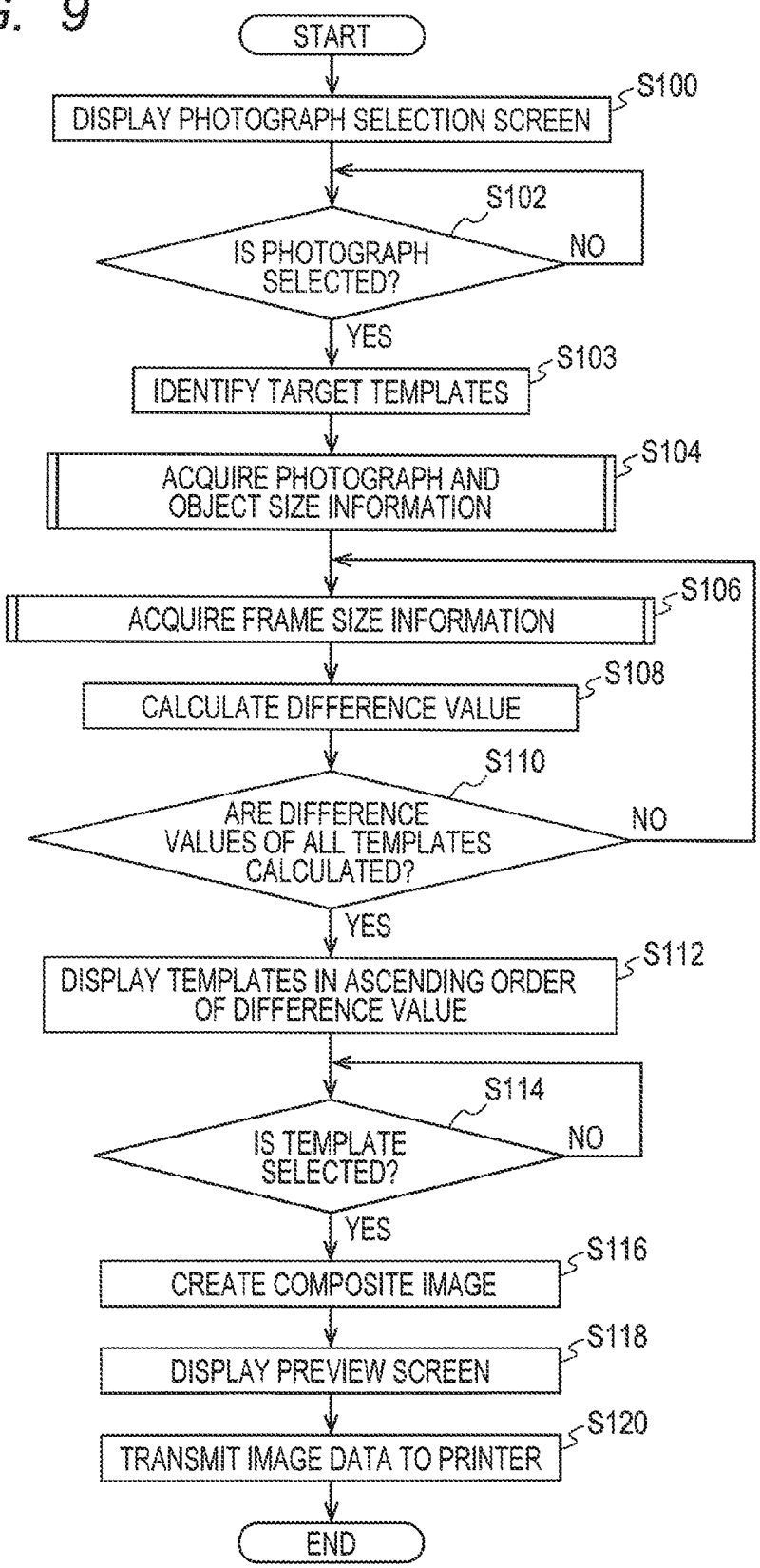
FIG. 9 is a flowchart showing processing of an application 30 according to a first embodiment.

In the above-described embodiments, the CPU 12 executes the processing shown in FIGS. 9 to 11. The processor of the processing is not limited to the CPU 12. Alternatively, the processing may be executed by an ASIC or other logic integrated circuit, or the processing may be executed by a combination of a CPU, an ASIC, other logic integrated circuit, and so on, in cooperation with each other.

What is claimed is:

1. A non-transitory computer-readable storage medium storing a set of instructions, the set of instructions, when executed by a computer of a terminal apparatus, causing the terminal apparatus to perform:

receiving a first selection operation of selecting a plurality of shot images;

acquiring a first characteristic amount relating to a shape of at least one of the plurality of shot images and an object included in the plurality of shot images;

acquiring a second characteristic amount relating to a shape of each frame included in each of a plurality of templates;

controlling a display to display a selection screen for allowing a user to select one of the plurality of templates, the selection screen showing, as a particular template, a template including a same number of frames as the plurality of shot images in such a manner that the particular template is distinguishable from a template other than the particular template, at least one of the frames having the second characteristic amount indicative of a shape corresponding to the first characteristic amount;

receiving a second selection operation of selecting, as a selection template, a template on the selection screen;

creating a composite image by combining the plurality of shot images with frames included in the selection template; and outputting the composite image.

2. The non-transitory computer-readable storage medium according to claim 1, wherein the first characteristic amount includes information indicative of an aspect ratio of the object included in each of the plurality of shot images; and wherein the second characteristic amount includes information indicative of an aspect ratio of each frame included in each of the plurality of templates.

3. The non-transitory computer-readable storage medium according to claim 1, wherein the first characteristic amount includes information indicative of an aspect ratio of each of the plurality of shot images; and wherein the second characteristic amount includes information indicative of an aspect ratio of each frame included in each of the plurality of templates.

4. The non-transitory computer-readable storage medium according to claim 1, wherein the set of instructions, when executed by the computer of the terminal apparatus, causes the terminal apparatus to perform:

acquiring, as the first characteristic amount, a characteristic amount relating to a shape of each of the plurality of shot images and a characteristic amount relating to a shape of the object;

calculating a combined first characteristic amount by combining the characteristic amount relating to the shape of each of the plurality of shot images with the characteristic amount relating to the shape of the object by using a particular ratio; and controlling the display to display, as the particular template, a template including a frame of the second characteristic amount indicative of a shape corresponding to the combined first characteristic amount.

5. A non-transitory computer-readable storage medium storing a set of instructions, the set of instructions, when executed by a computer of a terminal apparatus, causing the terminal apparatus to perform:

receiving a first selection operation of selecting a shot image;

acquiring a first characteristic amount relating to a shape of at least one of the shot image and an object included in the shot image;

acquiring a second characteristic amount relating to a shape of a frame included in each of a plurality of templates;

determining an order of display of the plurality of templates such that the plurality of templates are displayed in ascending order of a difference between the first characteristic amount and the second characteristic amount;

controlling a display to display a selection screen for allowing a user to select one of the plurality of templates, the selection screen showing, as a particular template, a template including a frame of the second characteristic amount indicative of a shape corresponding to the first characteristic amount in such a manner that the particular template is distinguishable from a template other than the particular template, the plurality of templates being displayed in accordance with the determined order of display;

receiving a second selection operation of selecting, as a selection template, a template on the selection screen;

creating a composite image by combining the shot image with a frame included in the selection template; and outputting the composite image.

6. A non-transitory computer-readable storage medium storing a set of instructions, the set of instructions, when executed by a computer of a terminal apparatus, causing the terminal apparatus to perform:

receiving a first selection operation of selecting a shot image;

acquiring, as a first characteristic amount, an aspect ratio of the shot image and an aspect ratio of an object included in the shot image;

acquiring, as a second characteristic amount, an aspect ratio of a frame included in each of a plurality of templates;

calculating a first difference value between the aspect ratio of the frame included in each of the plurality of templates and the aspect ratio of the shot image;

calculating a second difference value between the aspect ratio of the frame included in each of the plurality of templates and the aspect ratio of the object;

calculating, for the frame of each of the plurality of templates, a third difference value by combining the first difference value with the second difference value by using a particular ratio; and controlling a display to display a selection screen for allowing a user to select one of the plurality of templates, the selection screen showing, as a particular template, a template including a frame of the second characteristic amount indicative of a shape corresponding to the first characteristic amount in such a manner that the particular template is distinguishable from a template other than the particular template, the plurality of templates being displayed in ascending order of the third difference value;

receiving a second selection operation of selecting, as a selection template, a template on the selection screen;

creating a composite image by combining the shot image with a frame included in the selection template; and outputting the composite image.

* * * * *